US012639675B2

(12) United States Patent
Ueki et al.

(10) Patent No.: US 12,639,675 B2
(45) Date of Patent: May 26, 2026

(54) INFORMATION PROCESSING DEVICE AND SYSTEM

(71) Applicant: TOYOTA JIDOSHA KABUSHIKI KAISHA, Toyota (JP)

(72) Inventors: Tomoyoshi Ueki, Toyota (JP); Nao Matsubara, Toyota (JP); Hiroshi Yamasaki, Nagoya (JP); Isao Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/925,639

(22) Filed: Oct. 24, 2024

(65) Prior Publication Data

US 2025/0232270 A1     Jul. 17, 2025

(30) Foreign Application Priority Data

Jan. 12, 2024    (JP) ................................. 2024-003366

(51) Int. Cl.
    *G06Q 30/00*        (2023.01)
    *G06Q 10/30*        (2023.01)
              (Continued)
(52) U.S. Cl.
    CPC ............. *G06Q 10/30* (2013.01); *G07C 5/008* (2013.01); *G07C 5/04* (2013.01)
(58) Field of Classification Search
    CPC .......... G06Q 10/30; G07C 5/008; G07C 5/04
    See application file for complete search history.

(56) References Cited

U.S. PATENT DOCUMENTS

| | | | |
|---|---|---|---|
| 8,996,212 B2 * | 3/2015 | Chen ....................... | B60L 1/003 701/22 |
| 11,724,615 B2 * | 8/2023 | Suzuki .................... | B60L 53/62 320/109 |

(Continued)

FOREIGN PATENT DOCUMENTS

| | | | | |
|---|---|---|---|---|
| JP | 2006-259964 A | 9/2006 | | |
| WO | WO-2013024484 A1 * | 2/2013 | ........... | G01R 31/382 |

(Continued)

OTHER PUBLICATIONS

Haynes, et al. "Optimizing Geographic Locations for Electric Vehicle Battery Recycling Preprocessing Facilities in California." RCS Sustainability, 2024, vol. 2, pp. 377-389. (Year: 2024).*

(Continued)

*Primary Examiner* — Luis A Brown
(74) *Attorney, Agent, or Firm* — SoraIP, Inc.

(57)            ABSTRACT
An information processing device predicts amounts of batteries to be recycled that are expected to be emitted over a predetermined period in each area. The information processing device determines whether there is a first recycling facility in which the amount of batteries to be recycled that are expected to be emitted over a predetermined period in the corresponding area is predicted to exceed the battery recycling capacity of the recycling facility. When determination is made that there is the first recycling facility, the information processing device identifies one or more second recycling facilities that are able to additionally recycle the batteries to be emitted that are expected to be emitted over the predetermined period in a first area corresponding to the first recycling facility and that are in excess of the battery recycling capacity of the first recycling facility.

4 Claims, 6 Drawing Sheets

(51) Int. Cl.
  G07C 5/00        (2006.01)
  G07C 5/04        (2006.01)

(56)            References Cited

U.S. PATENT DOCUMENTS

| | | | | | |
|---|---|---|---|---|---|
| 2012/0248868 | A1* | 10/2012 | Mobin | ................... | B60L 50/30 |
| | | | | | 414/589 |
| 2013/0026972 | A1* | 1/2013 | Luke | ................... | B60L 3/0046 |
| | | | | | 320/167 |
| 2014/0266006 | A1* | 9/2014 | Luke | ................... | H02J 7/751 |
| | | | | | 320/106 |
| 2019/0202414 | A1* | 7/2019 | Shih | ................... | B60L 53/66 |
| 2019/0202415 | A1* | 7/2019 | Lai | ................... | G06Q 10/025 |
| 2021/0049545 | A1* | 2/2021 | Adler | ................... | G06Q 10/0832 |
| 2022/0126725 | A1* | 4/2022 | Wang | ................... | B60L 53/63 |
| 2023/0204375 | A1* | 6/2023 | Nakamura | ......... | G01C 21/3679 |
| | | | | | 701/425 |
| 2023/0406154 | A1* | 12/2023 | Kim | ................... | H01M 10/425 |
| 2024/0169420 | A1* | 5/2024 | Kurimoto | .......... | G06Q 30/0645 |

FOREIGN PATENT DOCUMENTS

| | | | | | |
|---|---|---|---|---|---|
| WO | WO-2013118113 | A2 * | 8/2013 | ........... | G06Q 10/043 |
| WO | WO-2022082266 | A1 * | 4/2022 | ........... | B65F 1/1468 |

OTHER PUBLICATIONS

Sang, Vo Tri Duc, et al. "Electric vehicle battery technologies and capacity prediction: a comprehensive literature review of trends and influencing factors." Batteries 10.12 (2024): 451. (Year: 2024).*

Haynes, Megan W., Rodrigo Cáceres González, and Marta C. Hatzell. "Optimizing geographic locations for electric vehicle battery recycling preprocessing facilities in California." RSC Sustainability 2.2 (2024): 377-389. (Year: 2024).*

Hoyer, Claas, Karsten Kieckhafer, and Thomas S. Spengler. "Technology and capacity planning for the recycling of lithium-ion electric vehicle batteries in Germany." Journal of Business Economics 85.5 (2015): 505-544. (Year: 2015).*

* cited by examiner

FIG. 5

PREDICTION INFORMATION DB

| FACILITY ID | CORRESPONDING AREA S | AMOUNT RECYCLED | EXCESS AMOUNT/ ADDITIONAL RECYCLABLE AMOUNT |
|---|---|---|---|
| F001 | AREA A | ... | ▲... |
| F002 | AREA B | ... | ▽... |
| ... | ... | ... | ... |

INFORMATION PROCESSING DEVICE AND SYSTEM

CROSS-REFERENCE TO RELATED APPLICATION

This application claims priority to Japanese Patent Application No. 2024-003366 filed on Jan. 12, 2024, incorporated herein by reference in its entirety.

BACKGROUND

1. Technical Field

The present disclosure relates to processes for recycling batteries mounted in battery electric vehicles.

2. Description of Related Art

Japanese Unexamined Patent Application Publication No. 2006-259964 (JP 2006-259964 A) discloses a system for predicting the amount of collection of recyclable resources. In the system described in JP 2006-259964 A, the amount of emission of each recyclable resource from a specific store located in a specific area is calculated. Based on data on the amount of emission of each recyclable resource and data on the actual amount of collection of each recyclable resource in the specific area, the linkage ratio between the amount of emission of each recyclable resource and the actual amount of collection of each recyclable resource in the specific area is calculated. The linkage ratio corresponding to data on the amount of emission of each recyclable resource over a predetermined past period is used to calculate an estimated amount of collection of each recyclable resource from this area over the same length of period in the future.

SUMMARY

An object of the present disclosure is to provide a technique that contributes to promoting a process of recycling batteries mounted in battery electric vehicles.

An information processing device according to a first aspect of the present disclosure includes a control unit. The control unit is configured to acquire, for each of a plurality of battery electric vehicles, travel history information indicating a travel history and battery information indicating a state of a battery, identify areas to which the battery electric vehicles belong, based on the travel history information, predict amounts of batteries to be recycled that are expected to be emitted over a predetermined period in the areas, based on the battery information of each of the battery electric vehicles belonging to the areas, based on battery recycling capacities of recycling facilities corresponding to the areas and the amounts of batteries to be recycled that are expected to be emitted over the predetermined period in the areas, determine whether there is a first recycling facility in which the amount of batteries to be recycled that are expected to be emitted over the predetermined period in a corresponding one of the areas is predicted to exceed the battery recycling capacity of the recycling facility, and when determination is made that there is the first recycling facility, identify one or more second recycling facilities that are able to additionally recycle the batteries to be recycled that are expected to be emitted over the predetermined period in a first area corresponding to the first recycling facility and that are in excess of the battery recycling capacity of the first recycling facility.

A system according to a second aspect of the present disclosure includes:

a first server device that communicates with a plurality of battery electric vehicles; and a second server device that communicates with the first server device.

The first server device is configured to receive, from each of the battery electric vehicles, travel history information indicating a travel history and battery information indicating a state of a battery.

The second server device is configured to receive, from the first server device, the travel history information and the battery information of each of the battery electric vehicles, identify areas to which the battery electric vehicles belong, based on the travel history information, predict amounts of batteries to be recycled that are expected to be emitted over a predetermined period in the areas, based on the battery information of each of the battery electric vehicles belonging to the areas, based on battery recycling capacities of recycling facilities corresponding to the areas and the amounts of batteries to be recycled that are expected to be emitted over the predetermined period in the areas, determine whether there is a first recycling facility in which the amount of batteries to be recycled that are expected to be emitted over the predetermined period in a corresponding one of the areas is predicted to exceed the battery recycling capacity of the recycling facility, and when determination is made that there is the first recycling facility, identify one or more second recycling facilities that are able to additionally recycle the batteries to be recycled that are expected to be emitted over the predetermined period in a first area corresponding to the first recycling facility and that are in excess of the battery recycling capacity of the first recycling facility.

The present disclosure can contribute to promoting a process of recycling batteries mounted in battery electric vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram illustrating an exemplary table configuration of prediction information.

DETAILED DESCRIPTION OF EMBODIMENTS

Figure 1:
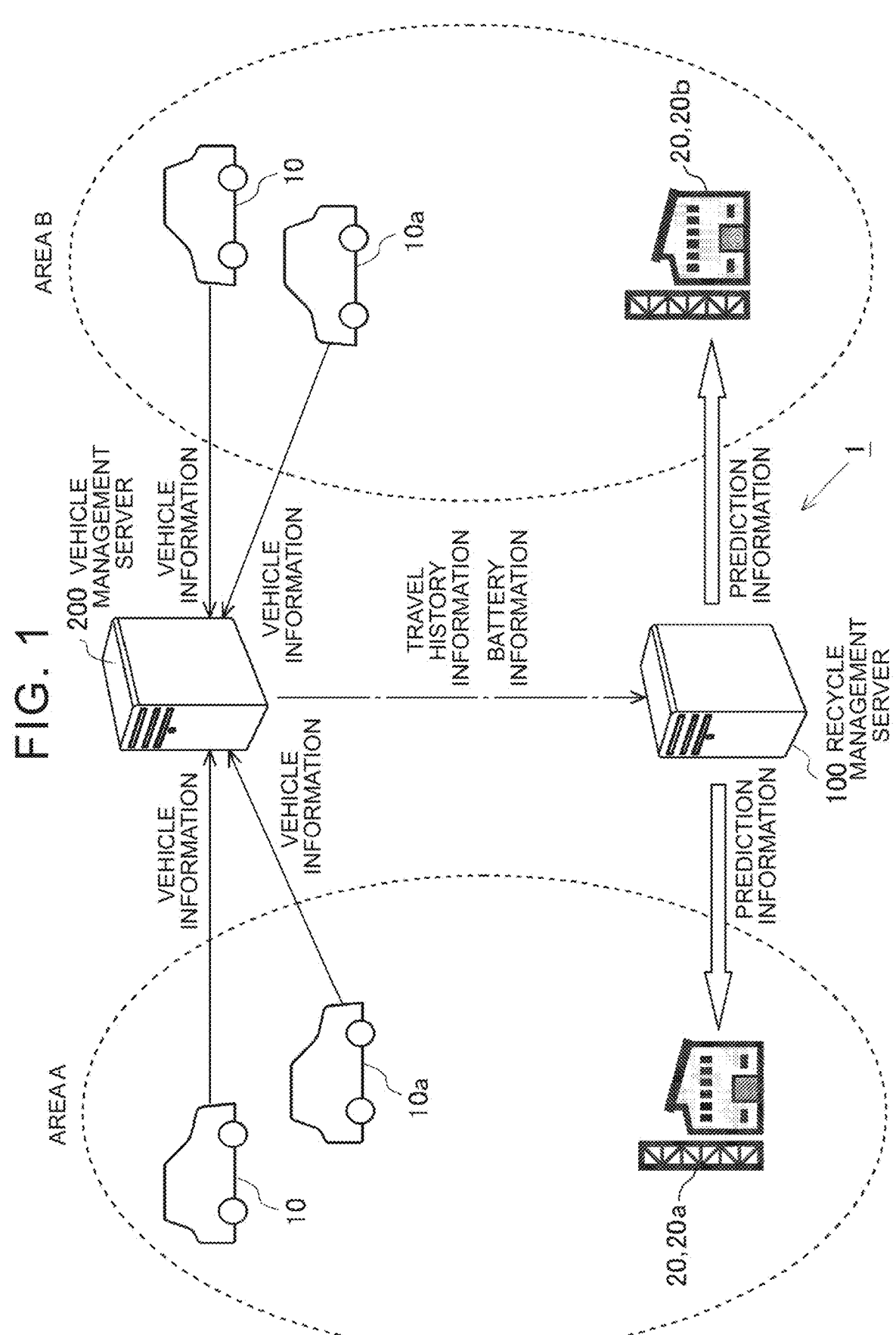
FIG. 1 is a diagram for explaining an outline of a recycle management system according to an embodiment.

In recent years, battery electric vehicle equipped with batteries for driving have been increasing. Here, battery electric vehicle may include not only the battery EV (BEV:

Battery Electric Vehicle) but also plug-in hybrid electric vehicle (PHEV: Plug-in Hybrid Electric Vehicle). The batteries mounted in battery electric vehicle can be recycled by taking out the materials used for the electrodes and the like, even if the performance of the batteries deteriorates due to aging or the like.

The present disclosure is directed to promoting the recycling of batteries in a recycling facility. The recycling facility is a facility in which batteries to be recycled that have been removed from battery electric vehicles are collected and the collected batteries are recycled. Each recycling facility has a corresponding area. Here, the "area" may be an administrative section such as a prefecture or a municipality, or an area within a predetermined range from a recycling facility. It is estimated that each recycling facility collects the batteries to be recycled that have been emitted in a corresponding area.

An information processing device according to the present disclosure includes a control unit. The control unit acquires travel history information and battery information of each of the plurality of battery electric vehicle. The travel history information is information indicating the travel history of the respective battery electric vehicle. The battery information is information indicating the status of the batteries (battery for driving) of the respective battery electric vehicle. Then, the control unit specifies the area to which the respective battery electric vehicle belong based on the travel history information. When a battery mounted in a battery electric vehicle is to be recycled, the battery removed from the battery electric vehicle is estimated to be collected in a recycling facility corresponding to the area to which the battery electric vehicle belongs.

According to the battery information, it is possible to estimate when the battery mounted in each battery electric vehicle is to be recycled. Therefore, the control unit predicts the amount of batteries to be recycled that are expected to be emitted over a predetermined period in each area, based on the battery information on each of the plurality of battery electric vehicle belonging to each area.

There is an upper limit to the battery recycling capacity of each recycling facility. That is, there is an upper limit to the amount of batteries that can be recycled within a certain period of time in a recycling facility. In addition, the amount of batteries to be recycled that are expected to be emitted in one area may exceed the battery recycling capacity of the recycling facility corresponding to one area. A recycling facility in which the amount of batteries to be recycled that are expected to be emitted over a predetermined period in the corresponding area is predicted to exceed the battery recycling capacity of the facility is referred to as a first recycling facility.

When the amount of batteries to be recycled that are expected to be emitted in one area is less than the battery recycling capacity of the recycling facility corresponding to one area, the recycling facility corresponding to one area is able to additionally recycle batteries. A recycling facility that is able to additionally recycle the batteries to be recycled that are expected to be emitted over the predetermined period in a first area corresponding to the first recycling facility and that are in excess of the battery recycling capacity of the first recycling facility is herein referred to as second recycling facility.

Then, in the present disclosure, the control unit determines whether there is a first recycling facility, based on the battery recycling capacities of the recycling facilities corresponding to the areas and the amounts of batteries to be recycled that are expected to be emitted over the predetermined period in the areas. When it is determined that the first recycling facility is present, the control unit specifies one or a plurality of second recycling facilities. At this time, for example, the control unit can specify one or a plurality of second recycling facilities based on the amount of batteries that can be additionally recycled in each of the plurality of recycling facilities other than the first recycling facility.

According to the present disclosure, it is possible to prompt the second recycling facility to bring batteries in excess of the recycling capacity of the first recycling facility. That is, when the amount of batteries to be recycled that are expected to be emitted in a certain area exceeds the battery recycling capacity of the recycling facility, it is possible to prompt to take the excess batteries to the recycling facility that corresponds to another area and that is able to additionally recycle batteries. Thus, the recycling process of the battery can be promoted.

Hereinafter, an embodiment of the present disclosure will be described with reference to the drawings. The dimensions, materials, shapes, relative arrangements, and the like of the components described in the present embodiment are not intended to limit the technical scope of the present disclosure only thereto unless otherwise specified.

I. EMBODIMENTS

System Overview

FIG. 1 is a diagram for explaining an outline of a recycle management system according to the present embodiment. The recycle management system 1 is a system for promoting recycling of a battery for driving mounted in each vehicle 10. The vehicles 10 are battery electric vehicle (BEV or PHEV) equipped with batteries for driving.

The recycle management system 1 includes a vehicle management server 200 and a recycle management server 100. The vehicle management server 200 is a server that collects vehicle information from each vehicle 10. The recycle management server 100 is a server that manages a process of recycling batteries in each recycling facility 20. The recycling facility 20 is a facility in which batteries to be recycled are recycled. Examples of the recycling process include a process of decomposing a battery and recovering a material (lithium, cobalt, or the like). Further, in the present embodiment, the plurality of recycling facilities 20 are located in different areas. In the present embodiment, the recycle management server 100 corresponds to an "information processing device" according to the present disclosure.

The plurality of vehicles 10, the vehicle management server 200, the recycle management server 100, and the plurality of recycling facilities 20 are connected to each other via a network. Here, as the network, for example, a WAN (Wide Area Network) which is a public communication network such as the Internet or a telephone communication network such as a mobile telephone may be adopted.

Each vehicle 10 transmits vehicle information to the vehicle management server 200 at a predetermined timing via a network. The vehicle information includes at least vehicle ID, travel history information, and battery information. Here, the vehicle ID is information for identifying the vehicle 10. The travel history information is information indicating a travel history of the vehicle 10. The travel history information may include, for example, position information periodically acquired in the vehicle 10. Further, the travel history information may include information indicating a shop or a factory where the vehicle 10 is temporarily deposited for maintenance of the vehicle 10. The battery information is information indicating a state of a battery mounted in the vehicle 10. Battery info includes battery ID. The battery ID is used to identify a battery mounted in the vehicle 10. In addition, the battery information may include data correlated with the degree of degradation of the battery, such as SoH (State of Health) value, the number of times of charge/discharge, and the maximum-output value. Each vehicle 10 may periodically transmit vehicle information to the vehicle management server 200 at predetermined intervals during traveling and parking. Further, the vehicle information extracted from the vehicle 10 in the shop or factory where the vehicle 10 is temporarily deposited may be transmitted from the shop or the terminal of the factory to the vehicle management server 200.

Basically, it is estimated that the batteries to be recycled that have been emitted in a corresponding area are collected in each recycling facility 20. For example, in FIG. 1, an area corresponding to the recycling facility 20a is referred to as area A, and an area corresponding to the recycling facility 20b is referred to as area B. It is estimated that the batteries to be recycled that have been emitted in the area A are collected in the recycling facility 20a, and the batteries to be recycled that have been emitted in the area B are collected in the recycling facility 20b.

Therefore, the recycle management server 100 predicts the amount of batteries to be recycled that are expected to be emitted in each area corresponding to each recycling facility 20. At this time, the recycle management server 100 predicts the amount of batteries to be recycled that are expected to be emitted in a predetermined period (for example, every month) in each area.

The recycle management server 100 receives the travel history information and the battery information of each vehicle 10 from the vehicle management server 200 via the network in order to predict the amount of batteries to be recycled that are emitted in each area. Then, the recycle management server 100 identifies the area to which each vehicle 10 belongs based on the travel history information of each vehicle 10. In FIG. 1, it is assumed that the vehicle 10 belonging to the area A is a vehicle 10a, and the vehicle 10 belonging to the area B is a vehicle 10b.

When deterioration of the battery mounted in each vehicle 10 progresses to some extent, the battery becomes a battery to be recycled. When a battery mounted in one vehicle 10 becomes a battery to be recycled, it is estimated that the battery removed from one vehicle 10 is collected in a recycling facility 20 corresponding to the area as a battery to be recycled that has been emitted in the area to which one vehicle 10 belongs.

Therefore, the recycle management server 100 estimates when the battery mounted in each vehicle 10 becomes a battery to be recycled, based on the data correlated with the degree of deterioration of the battery included in the battery information of each vehicle 10. The recycle management server 100 predicts the amount of batteries to be recycled that are expected to be emitted over a predetermined period in each area, based on the time when the battery mounted in each vehicle 10 becomes a battery to be recycled.

There is an upper limit of the battery recycling capacity of each recycling facility 20. Specifically, an upper limit value is set for the amount of batteries that can be recycled within a predetermined period of time in each recycling facility. When the amount of batteries to be recycled that are emitted over a predetermined period in one area increases, the amount of batteries to be recycled that are emitted over the predetermined period in one area may exceed the battery recycling capacity of the recycling facility 20 corresponding to one area. In such a case, if the amount of batteries exceeding the battery recycling capacity of the recycling facility 20 corresponding to one area is collected in the recycling facility 20 corresponding to one area, this makes it difficult to promote battery recycling.

Therefore, the recycle management server 100 compares the predicted value of the amount of batteries to be recycled that are expected to be emitted over a predetermined period in each area with the battery recycling capacity of the recycling facility 20 corresponding to each area. Accordingly, the recycle management server 100 determines whether there is the first recycling facility among the plurality of recycling facilities 20. The recycling facility 20 in which the amount of batteries to be recycled that are expected to be emitted over a predetermined period in the corresponding area is predicted to exceed the battery recycling capacity of the facility is referred to as a first recycling facility.

Further, when it is determined that the first recycling facility exists, the recycle management server 100 identifies one or more second recycling facilities from among the other recycling facilities 20. A recycling facility 20 that is able to additionally recycle batteries to be recycled that are expected to be emitted over a predetermined period in the first area corresponding to the first recycling facility and that are in excess of the battery recycling capacity of the first recycling facility is referred to as a second recycling facility. At this time, the recycle management server 100 can identify one or more second recycling facilities based on the amount of batteries that can be additionally recycled in each of the plurality of recycling facilities 20 other than the first recycling facility.

Then, the recycle management server 100 transmits the prediction information to the terminal associated with the first recycling facility and the terminal associated with the one or more second recycling facilities via the network. At this time, the prediction information includes information notifying that the amount of batteries to be recycled that are expected to be emitted over the predetermined period in the first area is predicted to exceed the battery recycling capacity of the first recycling facility. The prediction information also includes information notifying that one or more second recycling facilities are able to additionally recycle the batteries to be recycled that are in excess of the battery recycling capacity of the first recycling facility.

For example, in FIG. 1, it is assumed that the recycling facility 20a is the first recycling facility and the recycling facility 20b is the second recycling facility. The recycle management server 100 transmits the prediction information to each of the recycling facility 20a and the recycling facility 20b.

When the prediction information is received in the first recycling facility and the one or more second recycling facilities, prediction regarding recycling can be notified to each facility. That is, it is notified that the amount of batteries to be recycled that are expected to be emitted over the predetermined period in the first area is predicted to exceed the battery recycling capacity of the first recycling facility. In addition, it is notified that the one or more second recycling facilities are able to additionally recycle the batteries to be recycled that are in excess of the battery recycling capacity of the first recycling facility. As a result, it is possible to prompt the coordination between the two facilities so that the batteries that are in excess of the battery recycling capacity of the first recycling facility are taken to the second recycling facility. Therefore, the recycling process of the battery can be promoted.

Configuring the Recycle Management Server

Figure 2:
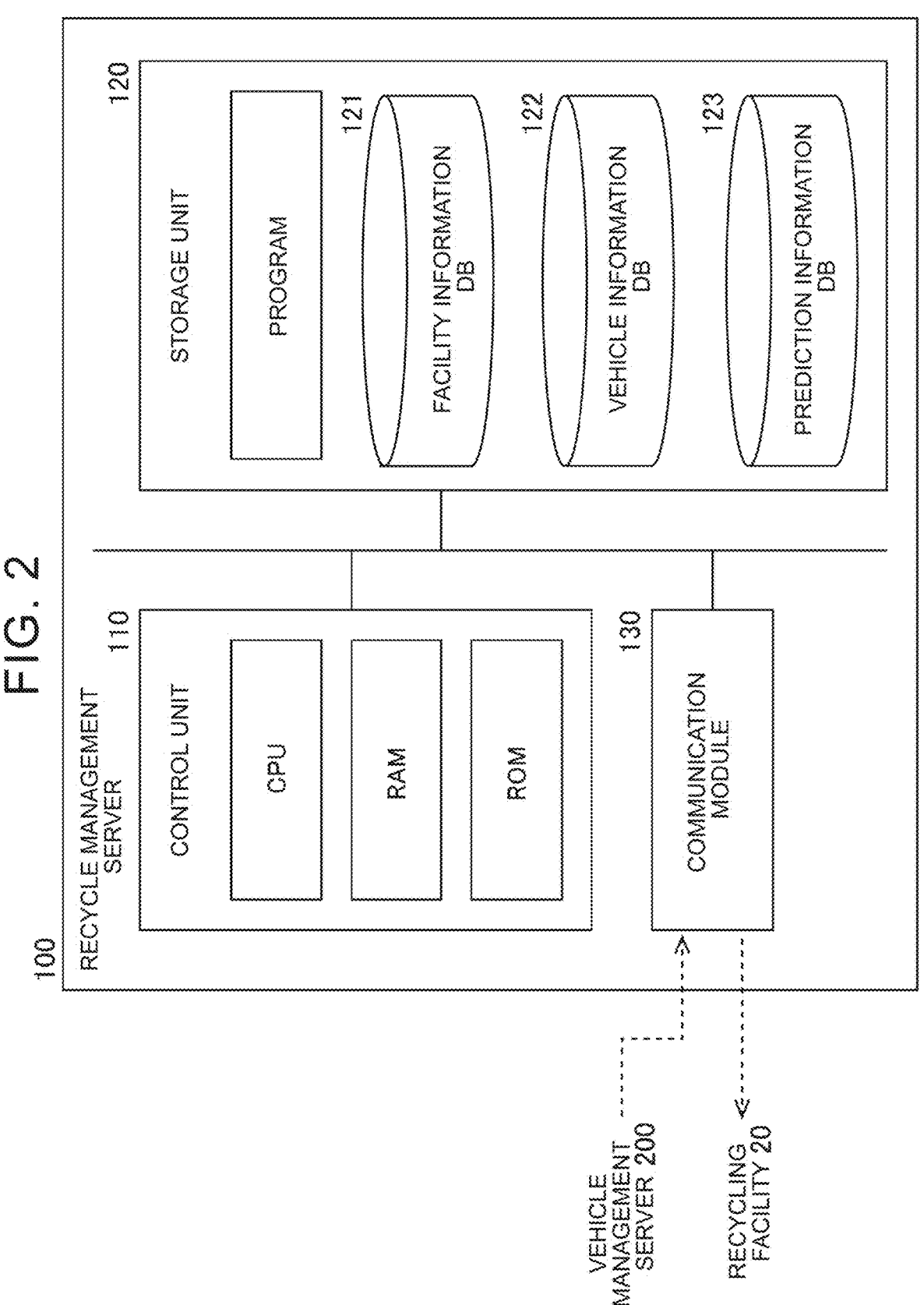
FIG. 2 is a block diagram schematically illustrating a configuration of a recycle management server.

Next, the configuration of the recycle management server 100 will be described. FIG. 2 is a block diagram schematically illustrating a configuration of the recycle management server 100. The recycle management server 100 includes a control unit 110, a storage unit 120, and a communication module 130.

The control unit 110 has a function of performing arithmetic processing for controlling the recycle management server 100. The control unit 110 includes a processor such as CPU (Central Processing Unit), a main storage device such as RAM (Random Access Memory), and a secondary storage device such as ROM (Read Only Memory). CPU is an exemplary processor resource. In addition, RAM and ROM are exemplary memory-resources. The control unit 110 can execute arbitrary information processing based on various programs and various types of data. However, some or all of the functions of the control unit 110 may be realized by a hardware-circuit such as an ASIC, FPGA.

The storage unit 120 is constituted by any storage device such as a RAM, ROM, a hard disk drive, or a flash memory. The storage unit 120 may include a removable medium (portable recording medium). Here, the removable medium is, for example, a USB memory, a SD card, or a disc recording medium such as a CD-ROM, DVD disc or a Blu-ray disc. The storage unit 120 stores programs to be executed by the control unit 110 and various types of data to be used for executing the programs.

In the storage unit 120, a facility information database (facility information DB) 121, a vehicle information database (vehicle information DB) 122, and a prediction information database (prediction information DB) 123 are constructed. The facility information DB 121 stores the battery recycling capacities of the respective recycling facilities 20 corresponding to the respective areas. Here, the amount of batteries that can be recycled within a certain period of time for each recycling facility 20 varies depending on the size, equipment, and the like of each facility. The battery recycling capacity of each recycling facility 20 may be stored in the facility information DB 121 as an amount of batteries that each recycling facility 20 is able to recycle in a certain period of time. The facility information DB 121 stores the battery recycling capacity of each recycling facility 20 in association with the facility ID for identifying the recycling facility 20. In the facility information DB 121, areas (corresponding areas) corresponding to the respective recycling facilities 20 are also stored in association with the facility ID. Detailed information stored in the vehicle information DB 122 and the prediction information DB 123 will be described later.

The communication module 130 is a communication interface for connecting the recycle management server 100 to a network. The communication module 130 is, for example, a LAN (Local Area Network) interface board or wireless communication circuitry for wireless communication. Note that the recycle management server 100 is not necessarily realized by a single physical configuration, and may be constituted by a plurality of computers that cooperate with each other.

The control unit 110 executes processing for receiving the travel history information and the battery information of each vehicle 10 from the vehicle management server 200 via the communication module 130. The recycle management server 100 receives the vehicle ID of the vehicles 10 together with the travel history information and the battery information. In addition, the control unit 110 executes processing for transmitting prediction information to the first recycling facility and one or more second recycling facilities via the communication module 130.

Information Processing by the Control Unit

Figure 3:
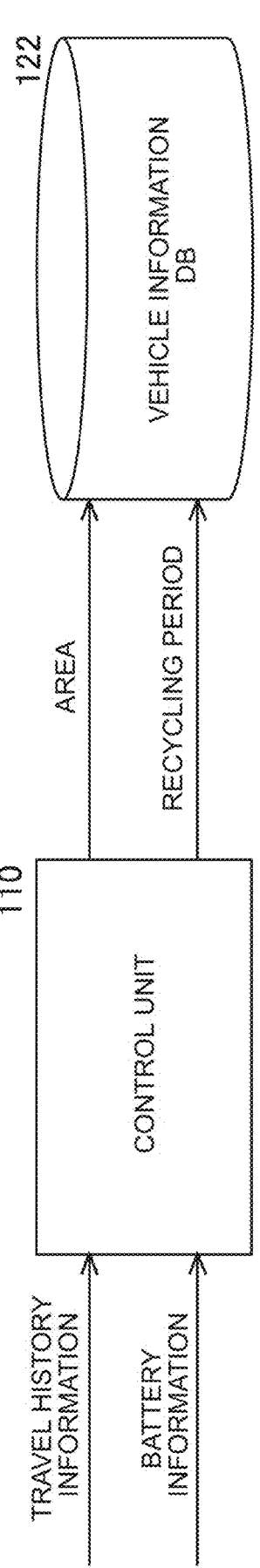
FIG. 3 is a diagram illustrating a first process executed by a control unit.

Hereinafter, information processing executed by the control unit 110 of the recycle management server 100 will be described with reference to FIG. 3 to FIG. 6. FIG. 3 is a diagram illustrating a first process executed by the control unit 110. In the first process, the control unit 110 acquires the travel history information and the battery information of each vehicle 10 received from the vehicle management server 200.

Then, the control unit 110 identifies an area (area to which each vehicle 10 belongs) based on the travel history information of each vehicle 10. Here, for example, an area in which the traveling frequency of the vehicle 10 derived from the traveling history information is highest may be specified as an area to which the vehicle 10 belongs. In addition, an area including a point where the parking frequency of the vehicle 10 is relatively high and the integrated value of the parking time is relatively large, which is derived from the travel history information, may be specified as an area to which the vehicle 10 belongs. In addition, in a case where information indicating a shop or a factory in which the vehicle 10 is temporarily deposited is included in the travel history information, it is highly likely that an operation for collecting a battery from the vehicle 10 for recycling is performed at the same shop or factory. Therefore, an area in which a shop or a factory where the vehicle 10 is temporarily deposited exists may be identified as an area to which the vehicle 10 belongs.

The control unit 110 estimates when the batteries mounted in the vehicles 10 become batteries to be recycled (recycling time), based on the battery information of the vehicles 10. Here, for example, thresholds may be set in advance with respect to certain data (such as SoH, number of times of charge/discharge, and maximum-output value) correlated with the degree of degradation of the battery included in the battery information. Then, a time at which the value of the specific data is predicted to reach a preset threshold value may be estimated as a recycling time. In this case, the threshold for the specific data may be set according to the type of the battery and stored in the storage unit 120 of the recycle management server 100.

In addition, the control unit 110 stores the specified area to which each vehicle 10 belongs and the estimated recycling time of the batteries of each vehicle 10 in the vehicle information DB 122. In the vehicle information DB 122, the area to which the vehicles 10 belong and the recycling time of the batteries are stored in association with the vehicle ID.

Figure 4:
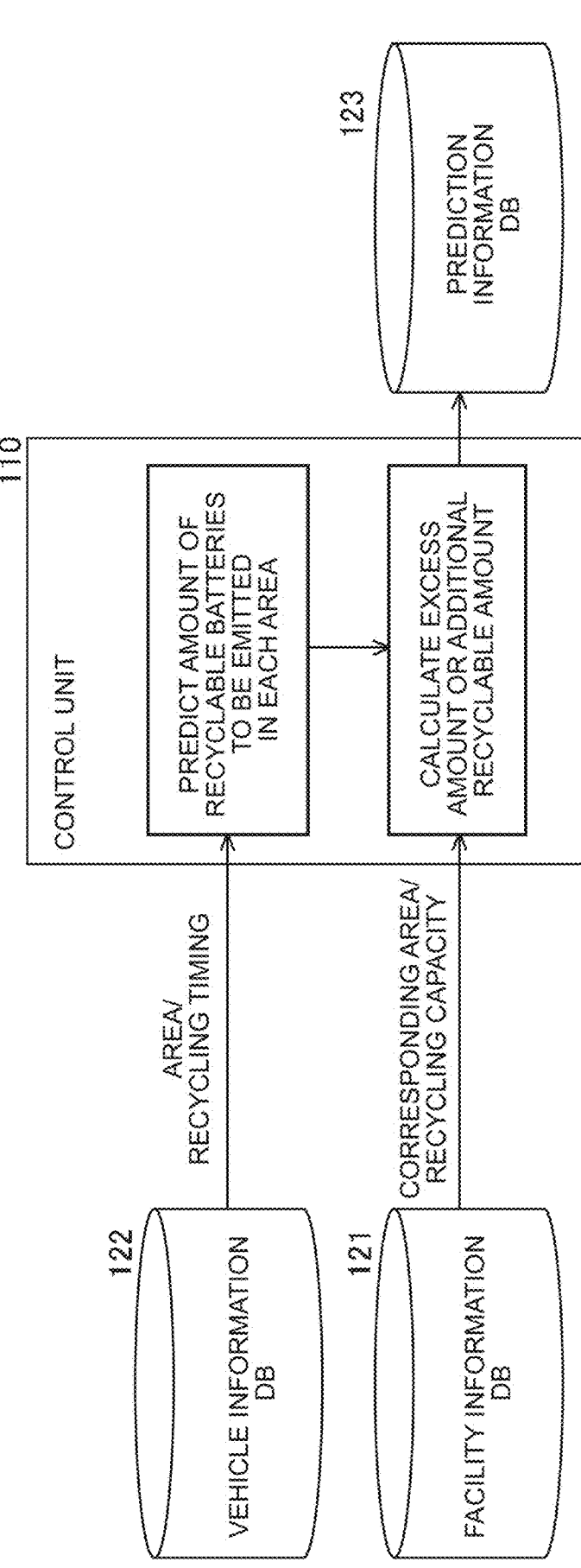
FIG. 4 is a diagram illustrating a second process executed by the control unit.

FIG. 4 is a diagram illustrating a second process executed by the control unit 110. In the second process, the control unit 110 acquires the area to which the vehicles 10 belong and the recycling time of the batteries stored in the vehicle information DB 122. Then, the control unit 110 classifies the plurality of vehicles 10 for each area to which the vehicle belongs. Further, the control unit 110 totalizes the number of vehicles 10 that reach the recycling time of the battery within a predetermined period of time for each area to which the vehicle belongs. As a result, the control unit 110 can predict the amount of batteries to be recycled that are expected to be emitted over a predetermined period in each area. For example, the amount of batteries to be recycled that are emitted in each month in each area may be predicted.

In addition, the control unit 110 acquires, from the facility information DB 121, the corresponding areas of the respective recycling facilities 20 and the battery recycling capacities. Then, the control unit 110 compares the amount of batteries to be recycled that are expected to be emitted over a predetermined period in the corresponding area with the battery processing capacity of the recycling facility 20 with respect to each of the recycling facilities 20. As a result, the control unit 110 calculates an excess amount or an additional recyclable amount for each recycling facility 20.

At this time, it may be predicted that the amount of batteries to be recycled that are expected to be emitted over a predetermined period in one area exceeds the battery recycling capacity of the recycling facility 20 corresponding to one area. In this case, the control unit 110 calculates the excess amount of batteries to be recycled as the excess amount for the recycling facility 20 corresponding to one area. In some cases, the amount of batteries to be recycled that are expected to be emitted over a predetermined period in one area is predicted to be smaller than the upper limit of the battery recycling capacity of the recycling facility 20 corresponding to one area. In this case, the control unit 110 calculates the difference between the amount of batteries to be recycled that are expected to be emitted over the predetermined period and the upper limit of the battery recycling capacity of the recycling facility 20 as the additional recyclable amount of the recycling facility 20 corresponding to one area. In other words, the additional recyclable amount of the recycling facility 20 is the amount of batteries that the recycling facility 20 is able to recycle in addition to the amount of batteries to be recycled that are expected to be emitted in the corresponding area.

In addition, the control unit 110 stores the calculated excess amount or the additional recyclable amount of each recycling facility 20 in the prediction information DB 123. FIG. 5 is a diagram illustrating an exemplary table configuration of a prediction-information DB 123. As illustrated in FIG. 5, the prediction information DB 123 includes a facility ID field, a corresponding area field, a recycling amount field, and an excess amount/additional recyclable amount field.

In the facility ID field, facility ID that is the identity of the respective recycling facilities 20 is inputted. In the corresponding area field, an area corresponding to each recycling facility 20 is input. In the recycling amount field, the amount of batteries to be recycled that are emitted over the predetermined period in an area corresponding to each recycling facility 20 is input. In the excess amount/additional recyclable amount field, an excess amount or an additional recyclable amount for each recycling facility 20 is input. For example, the amount of batteries to be recycled that are emitted in each month may be input to the recycle amount field. In addition, an excess amount or an additional recyclable amount may be input monthly in the excess amount/additional recyclable amount field. The recycling facility 20 in which the excess amount is input in the excess amount/additional recyclable amount field is the first recycling facility.

Figure 6:
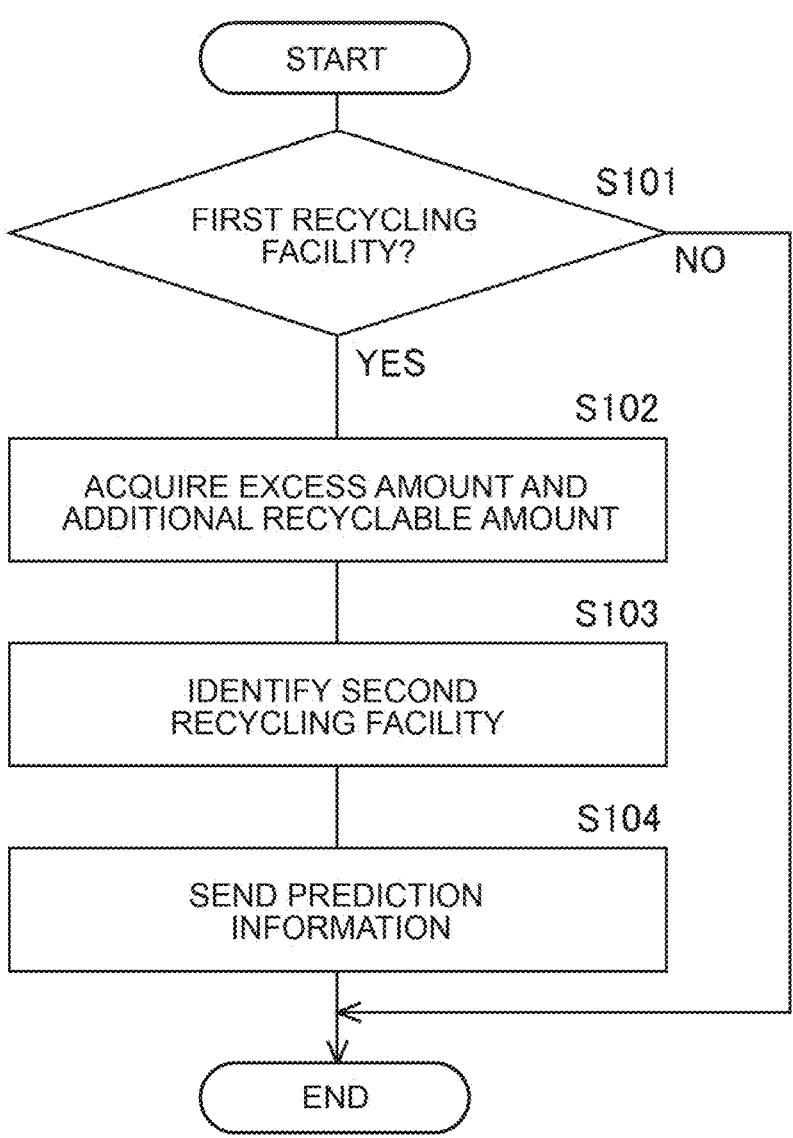
FIG. 6 is a flowchart illustrating a flow of a third process executed by the control unit.

FIG. 6 is a flowchart illustrating a flow of a third process executed by the control unit 110. This flow may be executed by the control unit 110 periodically with a certain period of time. In addition, the present flowchart may be executed by the control unit 110 every time information inputted to the prediction information DB 123 illustrated in FIG. 5 is updated.

In the third process, first, in S101, it is determined whether there is the first recycling facility by referring to the information inputted to the prediction information DB 123 shown in FIG. 5. If a negative determination is made in S101, the process ends. That is, in the prediction information DB 123, when the excess amount is not entered in the excess amount/additional recyclable amount field of any of the recycling facilities 20, the transmission of the prediction information is not necessary, and therefore, the execution of this process is terminated.

On the other hand, if an affirmative determination is made in S101, S102 process is executed next. In S102, the excess amount of the recycling facility specified as the first recycling facility is obtained from the prediction information DB 123. In addition, the additional recyclable amount for the recycling facility 20 other than the first recycling facility is acquired from the prediction information DB 123. At this time, in a case where monthly data is input in the recycle amount field and the excess amount/additional recyclable amount field, data of the excess amount and the additional recyclable amount in the same month is acquired.

Next, in S103, one or more second recycling facilities are identified based on the excess amount and the additional recyclable amount obtained in S102. The recycling facility 20 that is able to additionally recycle the excess amount of batteries to be recycled for the first recycling facility is specified as the second recycling facility. For example, one recycling facility 20 having an additional recyclable amount larger than the excess amount for the first recycling facility may be identified as the second recycling facility. In addition, the additional recyclable amount for any recycling facility 20 other than the first recycling facility may be less than the excess amount for the first recycling facility. In such a case, for example, a plurality of recycling facilities 20 may be selected and identified as the second recycling facility, such that the total of the additional recyclable amounts for a plurality of recycling facilities 20 other than the first recycling facility is equal to or greater than the excess amount for the first recycling facility.

Next, in S104, the prediction information is transmitted to the terminal associated with the first recycling facility and the terminal associated with the one or more second recycling facility. At this time, the transmitted prediction information is prediction information about the first recycling facility and the second recycling process extracted from the prediction information DB 123. As a result, the first recycling facility and the one or more second recycling facilities are notified that the amount of batteries to be recycled that are expected to be emitted over the predetermined period in the first area is predicted to exceed the battery recycling capacity of the first recycling facility. It is also notified to the first recycling facility and the one or more second recycling facilities that one or more second recycling facilities are able to additionally recycle the batteries to be recycled that are in excess of the battery recycling capacity of the first recycling facility.

Modifications

In each area, a distribution company may collect a battery to be recycled that has been removed from the vehicle 10 from a dealer, a factory, or the like. In this case, basically, the collected battery is transported by the distribution company to a recycling facility corresponding to the area where the battery is collected. The recycle management server 100 may also be interconnected by a network with terminals associated with a logistics company that collects such batteries and transports them to a recycling facility. Then, in S104 shown in FIG. 6, in place of or in addition to the first recycling facility and the one or more second recycling facilities, the prediction information may be transmitted to the terminal associated with the logistics company.

According to this, it is notified to the logistics company that the amount of batteries to be recycled that are expected to be emitted over the predetermined period in the first area is predicted to exceed the battery recycling capacity of the first recycling facility. The logistics company is also notified that one or more second recycling facilities are able to additionally recycle the batteries to be recycled that are in excess of the battery recycling capacity of the first recycling facility. Accordingly, the logistics company can be encouraged to transport batteries that are in excess of the recycling capacity of the first recycling facility to the second recycling facility. Therefore, the recycling process of the battery can also be promoted by transmitting the prediction information to the logistics company.

Further, the battery information transmitted to the vehicle management server 200 may include not only data correlated with the degree of deterioration of the battery itself but also data indicating the state of the vehicle 10 on which the battery is mounted. In this case, battery information including data indicating the state of the vehicle 10 on which the battery is mounted is transmitted from the vehicle management server 200 to the recycle management server 100.

At this time, in the recycle management server 100, the control unit 110 may estimate the recycle time of the battery mounted in each vehicle 10 based on the data indicating the state of each vehicle 10. For example, the data indicating the state of the vehicle 10 may include the total travel distance of the vehicle 10. When the total travel distance of the vehicle 10 is a long distance, the user of the vehicle 10 may discard the vehicle 10. When the vehicle 10 is discarded, the battery mounted in the vehicle 10 is highly likely to become a battery to be recycled at that timing. Therefore, a time at which the total travel distance of the vehicle 10 is predicted to reach the threshold value may be estimated as the recycling time.

II. OTHER EMBODIMENTS

The above-described embodiments are merely examples, and the present disclosure may be appropriately modified and implemented without departing from the scope thereof. For example, the processes and means described in the present disclosure can be free combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read-only memory (ROM), a random access memory (RAM), an erasable programmable read-only memory (EPROM), an electrically erasable programmable read only memory (EEPROM), a magnetic card, a flash memory, or any type of medium suitable for storing electronic commands such as an optical card.

12

What is claimed is:
1. A system comprising:
a first vehicle equipped with a first battery;
a second vehicle equipped with a second battery;
a first server device; and
a second server device, wherein:
the first vehicle is configured to
    communicate with the first server device, and
    transmit, to the first server device, first vehicle information including
        first travel history information indicating a travel history of the first vehicle and including location information of the first vehicle, and
        first battery information including first battery ID of the first battery and first data correlated with a degree of degradation of the first battery;
the second vehicle is configured to
    communicate with the first server device, and
    transmit, to the first server device, second vehicle information including
        second travel history information indicating a travel history of the second vehicle, that includes location information of the second vehicle, and
        second battery information including second battery ID of the second battery and second data correlated with a degree of degradation of the second battery;
the first server device is configured to
    communicate with the first vehicle, the second vehicle, and the second server device,
    receive the first vehicle information from the first vehicle,
    receive the second vehicle information from the second vehicle, and
    transmit the first vehicle information and the second vehicle information to the second server device; and
the second server device is configured to
    receive the first vehicle information and the second vehicle information from the first server device,
    identify an area where a parking frequency of the first vehicle is the highest and an integrated value of a parking time is the largest in areas included in the first travel history information, as a first area to which the first vehicle belongs,
    identify an area where a parking frequency of the second vehicle is the highest and an integrated value of a parking time is the largest in areas included in the second travel history information, as a second area to which the second vehicle belongs,
    determine a first recycling time at which the first battery becomes a battery to be recycled based on the first data,
    determine a second recycling time at which the second battery becomes a battery to be recycled based on the second data,
    determine first amounts of batteries to be recycled that are determined to become the battery to be recycled within a predetermined period in the first area, based on the first recycling time,
    determine second amounts of batteries to be recycled that are determined to become the battery to be recycled within the predetermined period in the second area, based on the second recycling time,
    obtain a first battery recycling capacity of first recycling facilities corresponding to the first area and a second battery recycling capacity of second recycling facilities corresponding to the second area, calculate an excess amount of the first amounts of the batteries exceeding the first battery recycling capacity, determine whether the excess amount is positive value, in response to determining that the excess amount is positive value, calculate an additional amount, which is a difference between the second battery recycling capacity and the second amounts of the batteries, determine whether the additional amount exceeds the excess amount, in response to determining that the additional amount exceeds the excess amount, transmit, to a device of a logistics company, a notification for encouraging the logistics company to transport batteries that are in excess of the first battery recycling capacity to the second recycling facility, wherein the logistics company is a company that collects batteries to be recycled that have been emitted in the first area and transport the collected batteries to the first recycling facility, and the notification includes a notification that the first amounts of the batteries exceed the first battery recycling capacity and a notification that the second recycling facility is able to additionally recycle the batteries that are in excess of the first battery recycling capacity.

2. The system according to claim 1, wherein the second server device is configured to determine a time at which a value of the first data is predicted to reach a first preset threshold value as the first recycling time.

3. The system according to claim 2, wherein the first preset threshold value is set based on a type of the first battery.

4. The system according to claim 1, wherein:

the first battery information includes information of a total travel distance of the first vehicle; and the second server device is configured to determine a time at which a value of the total travel distance of the first vehicle is predicted to reach a threshold value, as the first recycling time.

* * * * *